United States Patent [19]
Legendre et al.

[11] Patent Number: 5,788,462
[45] Date of Patent: Aug. 4, 1998

[54] HINGELESS ROTOR WITH INTERMEDIATE PITCH-CONTROL RINGS

[75] Inventors: Philippe Maurice René Legendre, Grans; Thomas Pierre Louis Manfredotti, Eguilles; Philippe Maurice Paul Antomarchi, Marseille, all of France

[73] Assignee: Eurocopter France, France

[21] Appl. No.: 573,781

[22] Filed: Dec. 18, 1995

[30] Foreign Application Priority Data

Dec. 22, 1994 [FR] France .................... 94 15472

[51] Int. Cl.$^6$ ............................ B64C 27/33; B64C 27/39
[52] U.S. Cl. .................. 416/134 A; 416/140; 416/141; 416/168 R; 416/230
[58] Field of Search .......................... 416/134 A, 138, 416/140, 141, 168 R, 229 R, 230

[56] References Cited

U.S. PATENT DOCUMENTS

| | | |
|---|---|---|
| 3,594,097 | 7/1971 | Mouille et al. . |
| 3,669,566 | 6/1972 | Bourguardez et al. . |
| 3,734,644 | 5/1973 | Garcia . |
| 4,053,258 | 10/1977 | Mouille . |
| 4,244,677 | 1/1981 | Noehren et al. ............ 416/134 A |
| 4,342,540 | 8/1982 | Lovera et al. ................ 416/140 |
| 4,626,173 | 12/1986 | Mouille et al. . |
| 4,690,616 | 9/1987 | Hahn et al. . |
| 4,732,540 | 3/1988 | Mouille et al. .............. 416/140 |
| 5,242,267 | 9/1993 | Byrnes et al. ............... 416/134 A |
| 5,372,479 | 12/1994 | Byrnes et al. ............... 416/134 A |

FOREIGN PATENT DOCUMENTS

| | | |
|---|---|---|
| 2474395 | 7/1981 | France . |
| 32 41 754 | 5/1984 | Germany . |
| 36 03 400 | 5/1987 | Germany . |
| 1 109 552 | 4/1968 | United Kingdom . |
| 2 014 931 | 5/1979 | United Kingdom . |

*Primary Examiner*—Christopher Verdier
*Attorney, Agent, or Firm*—Henderson & Sturm

[57] ABSTRACT

A hingeless rotor including a rotor mast driven in rotation about an axis of the rotor, a hub secured in terms of rotation to the mast, and at least two blades, each of which is, firstly, joined to the hub by a root attachment part comprising at least one arm which can twist about a longitudinal pitch-change axis of the blade and, secondly, equipped with a cuff which is rigid in torsion, surrounding the at least one twistable arm, and the radially external part of the cuff, with respect to the rotor axis is secured in terms of torsion to the blade and to the twistable arm about the pitch-change axis, while the radially internal part of the cuff surrounds, without contact, the at least one twistable arm and exhibits a pitch lever projecting towards the outside of the cuff and joined to a pitch-control rod, wherein, for each blade, an intermediate pitch-control ring which is rigid in terms of torsion about the corresponding pitch-change axis, and which surrounds the corresponding at least one twistable arm is arranged substantially between the hub and the radially internal part of the corresponding cuff, the ring being joined to the hub and the radially internal part of the corresponding hub by two ball joints, the first one of which articulates the ring to the hub and the second one of which articulates the ring to the cuff.

20 Claims, 4 Drawing Sheets

HINGELESS ROTOR WITH INTERMEDIATE PITCH-CONTROL RINGS

The invention relates to a rotor of the so-called "hingeless" type, which may be a main (lift) rotor, or a counter-torque (tail) rotor for a rotary-wing aircraft such as a helicopter, the rotor being equipped, for each blade, with an intermediate ring for controlling the collective and cyclic pitch of this blade.

Numerous embodiments of hingeless rotors are known, of the type comprising:
a rotor mast driven in rotation about an axis of the rotor,
a hub secured in terms of rotation to the mast,
at least two blades, each of which is, on the one hand, joined to the hub by a root attachment part comprising at least one arm which can twist about a longitudinal pitch-change axis of the blade and, on the other hand, equipped with a cuff which is rigid in torsion, surrounding the twistable arm, and of which the radially external part, with respect to the rotor axis is secured in terms of torsion to the blade and to the twistable arm about the pitch axis, while its radially internal part surrounds, without contact, the twistable arm and exhibits a pitch lever projecting towards the outside of the cuff and joined to a pitch-control rod. In general, the latter is manoeuvred substantially in the direction of the rotor axis by an actuating mechanism linked to the flight controls actuated by the pilot.

Each blade may be linked individually to the hub by its root attachment part, connected to one or all of the spar(s) of the blade, or constituting a radially internal extension of this or these spars, as described in the American Patent U.S. Pat. No. 4,690,616, relating to a hingeless main rotor.

However, it is also possible for the root attachment part of each blade to be a portion of a thin strip common to two opposite blades, for which this thin strip constitutes or extends the spars, as described by way of example in French Patent U.S. Pat. No. 4,053,258, relating to a helicopter counter-torque rotor. In such a rotor, the thin strip forming the flexible spars of two opposite blades, each of which is surrounded by a profiled shell to form the corresponding blade, is set via its middle part between two hub plates fixed to a rotor shaft, and the pitch of the blades is controlled by the twisting of the thin strip over a fraction of its length, at the point where the root of each blade is attached to the hub.

In the case of a main rotor, the mechanism for actuating the pitch-control rod is generally a swashplates mechanism including a rotating plate driven in rotation with the rotor, for example with the aid of at least one scissors fitting articulated, on the one hand, to the rotating plate and, on the other hand, to the hub or to the rotor mast, the pitch-control rod of each blade being articulated to this rotating plate, mounted so that it can rotate on a non-rotating plate acted upon by actuators such as servo-control rams linking it to a non-rotating structure of the helicopter, and the swashplates mechanism also comprising means for guiding the two plates in terms of translation parallel to the axis of the rotor, and means for guiding the inclination of the two plates with respect to the axis of the rotor.

These means for guidance in terms of translation and in terms of inclination may be produced according to two known alternatives, and include means forming ball joints, for guiding the inclination of the two plates to the axis of the rotor, and either a slider sliding axially about a non-rotating sleeve surrounding the rotor mast, as described in French Patent FR 2,119,828, or guide rods, parallel to the axis of the rotor and arranged around the rotor mast, as described in German Patent DE 36 03 400, to constitute the means for guiding the two plates in terms of translation.

For a counter-torque rotor, the mechanism for actuating the pitch-control rod may be a spider plate mechanism including as many arms as the rotor has blades, this spider plate being controlled in terms of translation coaxially with the rotor mast, to which it is secured in terms of rotation, and each arm of the spider plate being linked to the pitch lever of the corresponding blade by means of the pitch-control rod so as to provide the collective control of the pitch of the blades by controlling the axial position of the spider plate with respect to the rotor mast. Such an actuating mechanism for collective control of the pitch of the blades of the tail rotor is, for example, described in American Patents U.S. Pat. No. 3,594,097 and U.S. Pat. No. 4,626,173 of the Assignee Company.

In hingeless rotors of the abovementioned type, and as described, by way of example, in the aforementioned Patents U.S. Pat. No. 4,690,616 and U.S. Pat. No. 4,053,258, each torsionally rigid cuff transmits the pitch control for the corresponding blade between the pitch lever, acted upon by the corresponding pitch-control rod, and the blade. For it to be possible for the travel of the pitch-control rod to translate effectively into a twisting of the corresponding twistable arm and a rotation of the blade about its pitch axis, it is known to install at least one bearing between the cuff and the root attachment part of the blade, as proposed for example in U.S. Pat. No. 4,690,616, or the hub, as proposed in U.S. Pat. No. 4,053,258, so that the bearing or bearings take up a shear force originating from the pitch-control rod which is articulated to the pitch lever at a point which is relatively off-centre with respect to the pitch axis of the blade, since it is situated on the outside of the cuff, usually forward of the latter, on the leading edge side of the blade, but also sometimes at the back of the cuff, on the trailing edge side.

In these embodiments, in which the twistable arm often comprises at least one thin strip made of a composite material with an organic matrix, generally a thermosetting matrix, reinforced by inorganic or organic longitudinal reinforcing fibres, and usually simultaneously constitutes a flexible arm allowing the flapping and drag movements of the blade, the means forming a bearing between, on the one hand, the cuff and, on the other hand, the hub or the root attachment part of the corresponding blade are bearing means which allow five degrees of freedom, so as to take up the forces originating from the corresponding pitch-control rod.

When the twistable arm is slender (in the direction of the axis of the rotor), as is generally the case with a thin strip made of composite materials, the bearing or bearings are generally produced using selflubricating ball joints (see U.S. Pat. No. 4,690,616) stressed axially by the manufacturing tolerances and extensions of the twistable arms under the effect of centrifugal forces acting upon the blades, and this leads to rapid wear of the ball joints and poses a problem of reliability, and/or with the aid of laminated bearings comprising at least one pad of visco-elastic material between two rigid reinforcing members, this leading to a solution which is penalizing in terms of costs and, possibly, in both cases, of maintenance since the inspecting of the ball joint or of the laminated bearing is made difficult by the fact that it is mounted inside the cuff, as proposed in U.S. Pat. No. 4,053,258 and DE 3,241,754.

In contrast, when the twistable and flexible arms are thick, and exhibit a structure like the one described in particular in the Patent U.S. Pat. No. 3,669,566 and manufactured by a process as described in the Patent FR 2,474,395, that is to say with a central part of ternary composite structure comprising a bundle of longitudinal fibres or rods individually coated and agglomerated by a vulcanized elastomer ensuring elastic return to an initial position of rest, and such that each fibre or rod itself consists of a bundle of a large number of filaments agglomerated by a polymerized thermosetting resin, the assembly having a transverse section which may be of oval shape flattened in the plane of rotation of the rotor and possibly being enveloped in an inextensile flexible sheath, it is known that the solutions presented hereinabove for a bearing using a conventional ball joint or a laminated elastomeric one cannot be applied.

The object of the invention is to propose a hingeless rotor equipped with a pitch-control device which makes it possible to overcome the aforementioned drawbacks, and is better suited than the known ones to the various practical requirements, and especially by virtue of which pitch control is obtained by introducing reduced shear forces and moments into the torsionally rigid cuffs.

Another object of the invention is to propose a hingeless rotor with a pitch-control device which is reliable, durable, economical, both in terms of manufacture and in terms of assembly, and easier to maintain.

To this end, the hingeless rotor according to the invention, as defined hereinabove, is characterized in that it comprises, for each blade, an intermediate pitch-control ring which is rigid in terms of torsion about the corresponding pitch axis, which surrounds the corresponding twistable arm and which is arranged substantially between the hub and the radially internal part of the corresponding cuff, to which elements the ring is joined by two ball joints, a first one of which articulates it to the hub and the second of which articulates it to the cuff.

In such a rotor, the pitch-control device with intermediate ring for each blade effectively affords the corresponding cuff five degrees of freedom, and blocks the translation of this cuff parallel to the axis of the rotor.

When the pitch of a blade is set, the travel applied to the corresponding pitch lever by tension or compression in the pitch-control rod brings about a pivoting of the cuff with respect to the intermediate ring about an axis substantially parallel to the pitch axis and simultaneously a pivoting about another axis substantially parallel to the pitch axis of the intermediate ring with respect to the hub, and such that the centre of the cuff remains practically coincident with the centre of the twistable arm when the latter is quite stiff in terms of drag, which brings the centre of the cuff back to the centre of the twistable arm in the plane of rotation of the rotor.

Advantageously, to limit the pitch/flap and pitch/drag pairings, the mid-plane of the ring, perpendicular to its axis, is substantially perpendicular to the pitch axis of the corresponding blade, and, for preference, passes through the corresponding axis of flapping or close to the latter.

Also advantageously, in order substantially to balance the forces in the links of the intermediate ring, each of the two ball joints is held on the ring in respectively one of two positions which are substantially opposite one another with respect to the centre of the ring.

When each twistable arm has substantially the shape of a thin strip with a transverse section whose longest dimension is substantially perpendicular to the axis of the rotor and pitch axis of the corresponding blade, in order to display great stiffness in terms of drag, it is advantageous, to limit the size and improve the distribution of the stresses, that at least the radially internal part of the corresponding cuff and the corresponding intermediate ring each exhibit a substantially oval transverse section with their major axis substantially perpendicular to the axis of the rotor and corresponding pitch axis. The two ball joints for connection of the intermediate ring may then be centred substantially on the minor axis of the transverse section of this ring.

So that the pitch-control device of such a rotor remains readily compatible with the known mechanisms for actuating pitch-control rods (swashplates mechanisms for a main rotor or spider plate mechanisms for a counter-torque rotor, as defined hereinabove), each pitch-control rod is advantageously articulated to one end of the corresponding pitch lever which projects laterally with respect to one end of the major axis of the transverse section of the cuff in its radially internal part.

In order to load the two ball joints substantially evenly, it is advantageous for the pitch-control rod to be articulated to the pitch lever by a third ball joint centred substantially in the rotor plane, passing through the pitch axis and perpendicular to the rotor axis, it being possible for this plane to be the plane bisecting the segment extending between the centres of the two ball joints for connection of the intermediate ring. However, in such an embodiment, there is not only a slight pitch/flap pairing which remains acceptable bearing in mind the pitch range and is due to the slight shift of the centre of the cuff along the axis of the rotor, but also a slight pitch/drag pairing, which may be favourable in some cases.

In an embodiment which is advantageously simple to assemble and to service, for each blade, the intermediate ring bears two substantially radial lugs projecting towards the outside of the ring in two opposite directions, and in each of which there is mounted respectively one of the two ball joints for linking of the ring, the two ball joints being centred substantially in the mid-plane of the ring and each held by a transverse pin, the first in a clevis projecting laterally and radially above the hub (that is to say on the opposite side from the rotor mast), and the second in a clevis projecting under the cuff (that is to say on the rotor mast side).

To limit the cost of the pitch-control device for each blade, each ball joint for linking of the ring is of a type allowing a limited maximum angular travel for the relative pivoting of the two members which it articulates together, the sum of the maximum angular travels of the two linking ball joints being at least equal to the amplitude of the total pitch range, and, in a way which is favourable to the reliability of the ball joints, the limited maximum angular travel of each one of them is advantageously substantially equal to half the amplitude of the total pitch range.

Furthermore, in order advantageously to provide drag damping for the blades of the rotor, the latter may comprise, for each blade, a second intermediate ring which is also rigid in terms of torsion about the corresponding pitch axis and which also surrounds the corresponding twistable arm and is arranged between the hub and the corresponding cuff, the second ring being secured to at least one drag damper of the corresponding blade in an assembly which is articulated, on the one hand, by a fourth ball joint to the corresponding cuff and, on the other hand, by a fifth ball joint to a fixing point, the fourth and fifth ball joints being substantially centred in the rotor plane, passing through the pitch axis and perpendicular to the rotor axis.

In an alternative, the fixing point for the second ring/drag damper assembly is a point which is stationary in a rotating reference frame, on the hub or on the rotor mast. However, according to another alternative, it is also possible for this fixing point to be a point which is stationary on the cuff of another blade of the rotor, particularly a neighbouring blade, especially the preceding blade with respect to the direction of rotation of the rotor, in an architecture in which the second ring/drag damper assembly is mounted like an interblade tie sensitive only to the differential drag of the two adjacent blades which it joins together.

For the second intermediate ring to have similar kinematics to the first, joined to the hub and to the corresponding cuff, to make it possible to limit the effect of the cyclic pitch on the damper or dampers, the second ring is advantageously arranged so that its axis is substantially parallel to the rotor plane and its mid-plane, perpendicular to its axis, is substantially parallel to the mid-plane of the first intermediate ring.

Furthermore, for better dynamic drag matching, the drag damper, or each of them, is advantageously associated with elastic return means in the form of a subassembly constituting a frequency matcher between the corresponding cuff and the corresponding fixing point, on the hub or rotor mast, or on the cuff of a neighbouring blade.

In an embodiment of simple structure, the said articulated assembly comprises, for each blade, a single drag damper laterally secured to the second intermediate ring, which is articulated directly to the cuff by the fourth ball joint, while the damper is articulated directly to the corresponding fixing point by the fifth ball joint on the opposite side from the fourth ball joint with respect to the centred of the second ring and its link with the damper.

When each twistable arm of the rotor has substantially the shape of a thin strip of transverse section whose longest dimension is substantially perpendicular to the axis of the rotor and the corresponding pitch axis, the second ring likewise advantageously has a substantially oval transverse section with its major axis also substantially perpendicular to the axis of the rotor and the corresponding pitch axis, and on which the fourth and fifth ball joints are substantially centred, thus favourably arranged with respect to the first and second ball joints centred on the minor axis substantially parallel to the rotor axis of the first intermediate ring joined to the cuff and to the hub.

When the rotor is such that, for each blade, the twistable arm is also flexible in terms of flapping about an imaginary axis of flapping substantially perpendicular to the corresponding pitch axis and to the rotor axis, it is additionally advantageous for the first, second and third ball joints, and, as appropriate, the fourth and fifth ball joints, to be centred substantially in a plane perpendicular to the corresponding pitch axis and passing through the said axis of flapping, or close to such a plane, so as to limit any pitch/flap pairing as much as possible.

Likewise, to avoid or limit the pitch/drag pairings, it is advantageous for the first and second ball joints to be centred substantially on or close to the imaginary axis of drag of the blade, defined by the twistable and flexible arm in its root attachment part. However, it happens that the pitch/drag, pitch/flap and flap/drag pairings may be minimized, or alternatively optimized as required, by carefully arranging the first, second and third ball joints, and particularly so that the first and second ball joints are centred on either side of the axis of drag, substantially the same distance from this axis of drag.

Further advantages and features of the invention will emerge from the description given hereinbelow, without implied limitation, of embodiments described with reference to the appended drawings in which.

Figure 1:
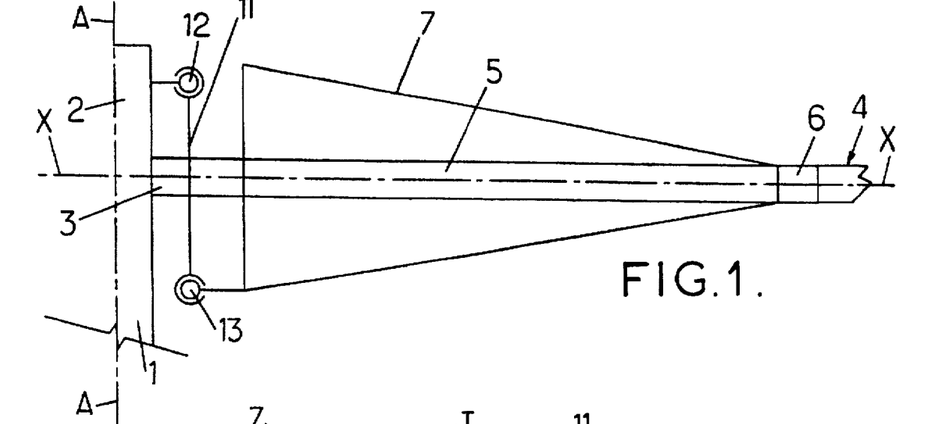
FIG. 1 is a diagrammatic view partly in section and partly in lateral elevation of a hingeless main rotor according to the invention, limited to one blade.
Figure 2:
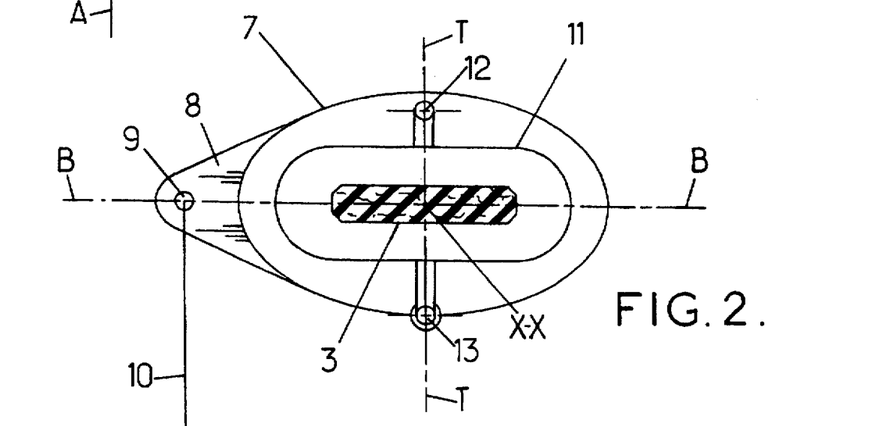
FIG. 2 is a diagrammatic view in transverse section of the rotor of FIG. 1 at the radially internal end of the cuff of the only blade represented.

The hingeless main rotor for a helicopter of FIGS. 1 and 2 comprises a rotor shaft or mast 1 driven by its base (not represented in FIG. 1) in rotation about the axis A—A of the rotor, and secured in terms of rotation at its opposite end to a hub 2 (which, in FIG. 1, is represented as simply being the upper end of the mast 1).

In practice, this hub 2 may comprise two superimposed plates fixed together trapping between them the intersecting central parts of twistable and flexible composite thin strips, such as 3, each constituting, on either side of its central part which is set into the hub 2, on the one hand, the spar of one of two opposite blades, such as 4, via its part and end which are radially external with respect to the axis A—A and, on the other hand, the root attachment part 5 of this same blade 4, via the thin strip portion 3 extending between the root 6 of the blade 4 and the hub 2, and passing through a torsionally rigid cuff 7 made of metal or composite material.

Each blade 4 is thus joined to the hub 2 by the root attachment part 5 consisting of an arm which can twist about the longitudinal pitch change axis X—X of the blade 4 and is formed by that part of the thin strip 3 which extends between the blade root 6 and the hub 2. At its radially external end (with respect to the axis of the rotor A—A), the cuff 7 is secured in terms of torsion about the pitch axis X—X to the blade root 6 of the blade 4 as well as to the twistable arm 5 which it surrounds. By contrast, the radially internal part of the cuff 7 surrounds without contact that part of the twistable arm 5 which is close to the hub 2.

This hingeless main rotor operates as follows: the oscillations of each blade 4 in terms of flapping take place by bending of the twistable and flexible arm 5 about an imaginary axis of flapping B—B extending substantially in the plane of rotation of the blades 4 (and therefore substantially perpendicular to the rotor axis A—A) and perpendicular to the pitch axis X—X of the blade 4 in question, passing through the centre of the thin strip 3 in that part of the arm 5 which is close to the hub 2, and extending between the latter and the radially internal end of the cuff 7; the oscillations of each blade 4 in terms of drag take place by bending of the corresponding arm 5 about an imaginary axis of drag T—T which is parallel to the rotor axis A—A and perpendicular to the pitch axis X—X of the blade 4 in question in this same part of the arm 5 extending between the hub 2 and the radially internal end of the cuff 7; the movements of each blade 4 in terms of pitch are permitted by a twisting of the arm 5 about the pitch axis X—X, the change in pitch of the blade 4 being controlled by virtue of a pitch lever 8, projecting laterally towards the outside of the cuff 7 on the leading edge side or trailing edge side of the blade 4, on the radially internal end part of the cuff 7, and to the free end of which there is articulated, by a ball joint represented diagrammatically as 9, one end of a pitch-control rod 10 which is articulated by its other end to a known actuating mechanism, generally a swashplates mechanism actuated by pilot controls.

In this example, the thin strip 3 made in a known manner of a bundle of unidirectional rovings of reinforcing fibres agglomerated in a polymerized synthetic matrix has a substantially rectangular transverse section (see FIG. 2) whose width, measured in the plane (of rotation) of the rotor and parallel to the axis of flapping B—B is very much greater than its thickness, measured parallel to the rotor axis A—A or to the axis of drag T—T so that the thin strip 3 is very stiff in terms of drag.

The cuff 7 exhibits a frustoconical overall shape with a small base (at its radially external end) rigidly linked in terms of torsion to the blade root 6 and with a large base (at its radially internal end) turned towards the hub 2, a small distance from the latter, and having a transverse section of oval shape, with a major axis substantially parallel to the axis of flapping B—B, in the initial pitch position or position of rest. The ball joint 9 articulating the rod 10 to the pitch lever 8 is centred on or close to the axis of flapping B—B and projects laterally with respect to the corresponding end of the major axis of the transverse section of the large base of the cuff 7.

For each blade 4, the rotor also comprises an intermediate pitch-control ring 11 which is rigid in terms of torsion about the pitch axis X—X and which surrounds, without contact when at rest, the corresponding arm 5, being arranged between the hub 2 and the radially internal end of the corresponding cuff 7. This ring 11 also exhibits a substantially oval or oblong transverse section (see FIG. 2) which is symmetrical, like that of the cuff 7, with respect to its major and minor axes, which are mutually perpendicular and perpendicular to its central axis. At rest, the central axis of the ring 11 is substantially coincident with the central axis of the cuff 7 and the pitch axis X—X, corresponding to the central axis of the thin strip 3, and the major and minor axes of the transverse section of the ring 11 are parallel respectively to the major and minor axes of the transverse section of the cuff 7.

The ring 11 is arranged so that its mid-plane, perpendicular to its central axis, is substantially perpendicular to the pitch axis X—X of the blade 4, and the ring 11 is articulated, on the one hand, to the hub 2 by a ball joint 12 and, on the other hand, to the radially internal end of the cuff 7 by another ball joint 13, preferably identical to the ball joint 12, the two ball joints 12 and 13 being mounted on the ring 11 each respectively in one of two positions which are diametrically opposed and symmetric to one another with respect to the central axis of the ring 11, being centred on the minor axis of its transverse section, that is to say on or close to the axis of drag T—T and in or close to a plane perpendicular to the pitch axis X—X and passing through the corresponding axis of flapping B—B. Thus, the ball joint 9 articulating the rod 10 to the pitch lever 8 is substantially centred in the plane bisecting the segment joining the centres of the two ball joints 12 and 13 for articulation of the ring 11.

Figure 3:
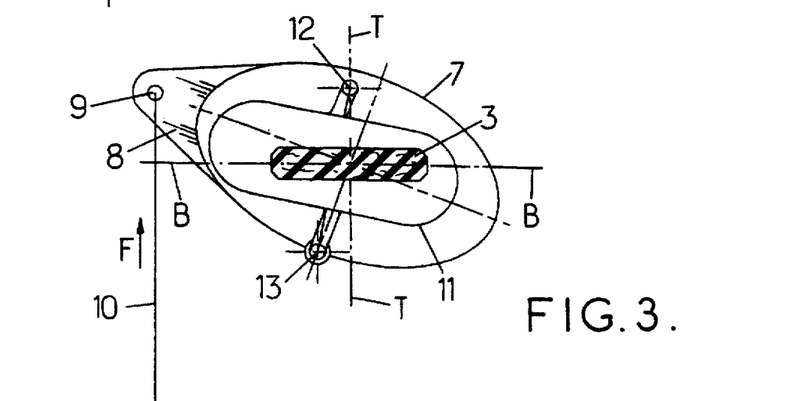
FIGS. 3 and 4 are views similar to FIG. 2 in a different pitch position.

Upon a pitch control exerted by the rod 10 on the pitch lever 8 and the cuff 7, for example by a longitudinal compression in the direction of the arrow F of FIG. 3, directed towards the lever 8, the latter and the cuff 7 pivot together, by virtue of the ball joint 13, with respect to the ring 11 about an axis substantially parallel to the pitch axis X—X, while at the same time the ring 11 pivots, by virtue of the ball joint 12, with respect to the hub 2, about an axis also substantially parallel to the pitch axis X—X. Each of the two identical ball joints 12 and 13 allows a limited maximum angular travel of the relative pivotings of the two members which it articulates to one another, which travel is substantially equal to, and preferably slightly greater than, half the amplitude of the total pitch range, so that the sum of the limited maximum angular travels of the two ball joints 12 and 13 is at least equal to this amplitude of the total pitch range of the corresponding blade 4.

The pitch-control device thus produced takes up the forces originating from the corresponding pitch-control rod 10 while allowing the cuff 7 five degrees of freedom, and thus fulfils the same functions as the bearings of the state of the art, and especially authorizes travel of the blade 4 in terms of drag, the relative travels of the cuff 7 and of the twistable arm 5 parallel to the axis X—X of the blade 4, under the effect of centrifugal forces, and the immobilizing of the cuff 7 in terms of flapping, in translation parallel to the rotor axis A—A.

For a thin strip 3 which is quite stiff in terms of drag, the centre of the cuff 7 remains practically coincident with the centre of the thin strip 3, that is to say on the axis X—X, the cuff 7 being returned to the centre along the axis of flapping by the great stiffness of the thin strip 3 in terms of drag, while the centre of the ring 11 is shifted slightly in flapping (along the axis of drag T—T) and in drag (along the axis of flapping B—B) as represented in FIG. 3.

Figure 4:
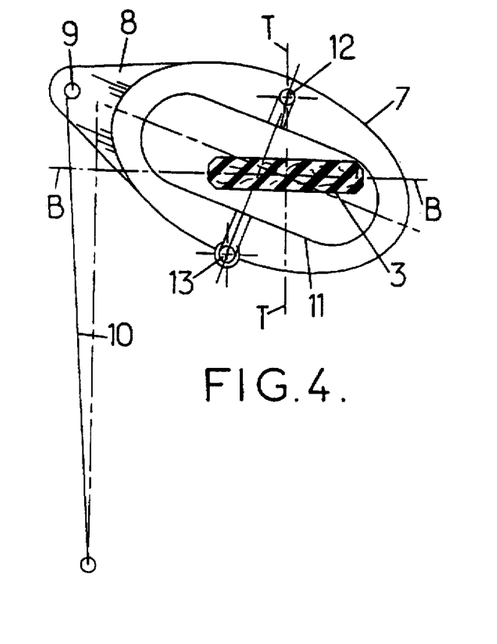

In the contrary case, as represented in FIG. 4, the centre of the cuff 7 moves, substantially with the centre of the ring 11, slightly parallel to the axis of drag T—T, which brings about a slight pitch/flap pairing which remains acceptable bearing in mind the pitch range, and also slightly parallel to the axis of flapping B—B so that there is a slight pitch/drag pairing which may be favourable in some cases.

Figure 5:
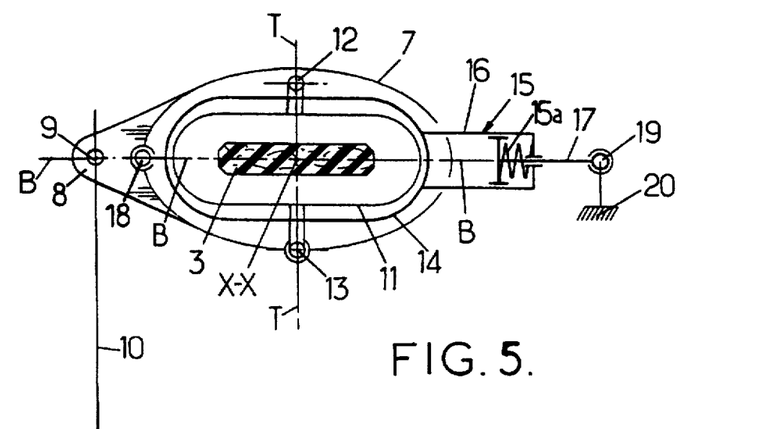
FIG. 5 is a view similar to FIG. 2 for an alternative embodiment.

Furthermore, in order to provide damping of the blades 4 in terms of drag, the rotor also comprises, for each of these blades, according to the alternative of FIG. 5, which is equipped with the same pitch lever arrangement 8 as in FIG. 2, an additional intermediate ring 14 to which a drag damper 15 is secured.

The second ring 14 is also rigid in terms of torsion about the corresponding pitch axis X—X, and also surrounds, without contact at rest, the thin strip 3 forming the corresponding twistable arm 5, in its part situated between the hub 2 and the corresponding cuff 7. In addition, the second ring 14 also has an oval or oblong transverse section analogous to that of the first ring 11, and the major and minor axes of which are both perpendicular to the corresponding pitch axis X—X and, at rest, respectively perpendicular and parallel to the rotor axis A—A or to the corresponding axis of drag T—T. In that way, at rest, the major and minor axes of the transverse section of the second ring 14 are parallel respectively to the major and minor axes of the transverse sections of the cuff 7 and of the first ring 11, and the central axis of the second ring 14 is coincident with the central axes of the first ring 11, of the cuff 7 and of the thin strip 3, that is to say with the pitch axis X—X. The second ring 14 is arranged so that its mid-plane, perpendicular to its central axis, is parallel to the mid-plane of the first ring 11.

The drag damper 15 is centred around the major axis of the transverse section of the second ring 14 and fixed transversely with respect to the pitch axis X—X and laterally to the second ring 14, being secured to a curved part of the latter about one end of its major axis, by one end of the body 16 of the damper 15, equipped with a rod 17 which slides with respect to the body 16 with damping and parallel to the major axis of the section of the second ring 14.

The rod 17 may be secured to a piston sliding in the cylindrical body 16 and interacting in the latter with a damping fluid as represented diagrammatically in FIG. 5, in the case of a fluid-type damper 15 which may be of any conventional structure, but the rod 17 may equally well interact with the body 16 by shearing of at least one layer or pad of a visco-elastic elastomer.

In all cases, the assembly formed of the second ring 14 and of the drag damper 15 is articulated, on the one hand, directly to the cuff 7 by a fourth ball joint 18 mounted on the second ring 14 at the end of the major axis of its transverse section, on the opposite side from the drag damper 15 and, on the other hand, to a fixing point 20 by a fifth ball joint 19 mounted at the free end of the rod 17 of the damper 15, that is to say at that end of the assembly which is the opposite end from the fourth ball joint 18 with respect to the centre of the second ring 14 and to the connection between this ring 14 and the damper 15.

The ball joints 18 and 19 are thus centred in the plane of the rotor (perpendicular to the rotor axis A—A and passing through the pitch axis X—X), and more precisely on the major axis of the transverse section of the second ring 14, that is to say on or close to the corresponding axis of flapping B—B.

In this way, the ball joints 9, 12 and 13 like the ball joints 18 and 19 are centred substantially in or close to a plane perpendicular to the corresponding pitch axis X—X and passing through the corresponding axis of flapping B—B.

The pitch/flap and pitch/drag pairings are thus limited.

The fixing point 20 to which the drag damper 15 is articulated by the ball joint 19 is, for example, a point which is stationary in a rotating reference frame, on the hub 2 or, optionally, on the rotor mast 1.

As an alternative, this fixing point 20 is a stationary point on the cuff 7 of another blade 4 of the rotor, and in particular of the neighbouring blade 4, which is either the immediately preceding blade, bearing in mind the direction of rotation of the rotor, when the pitch lever 8 projects laterally from the cuff 7 on the trailing edge side of the corresponding blade 4, or the immediately following blade when the pitch lever 8 projects on the leading edge side of the blade 4.

In the alternative of FIG. 5, the second ring 14 is mounted with kinematics similar to those of the first ring 11, which makes it possible to limit the effects of the cyclic pitch on the damper 15.

As an alternative, elastic return means 15a like a spring may be combined with the drag damper 15 to form a frequency matcher, giving a better dynamic drag matching between the second ring 14 articulated to the cuff 7 and the hub 2 or the cuff 7 of an adjacent blade.

Also as an alternative, a second drag damper may be secured to the second ring 14, symmetrically with the damper 15, with respect to the centre of the ring 14, in which case the assembly formed by the second ring 14 and the two dampers such as 15 is articulated to the cuff 7 by the ball joint 18 mounted at the free end of the rod of the second damper.

Figure 6:
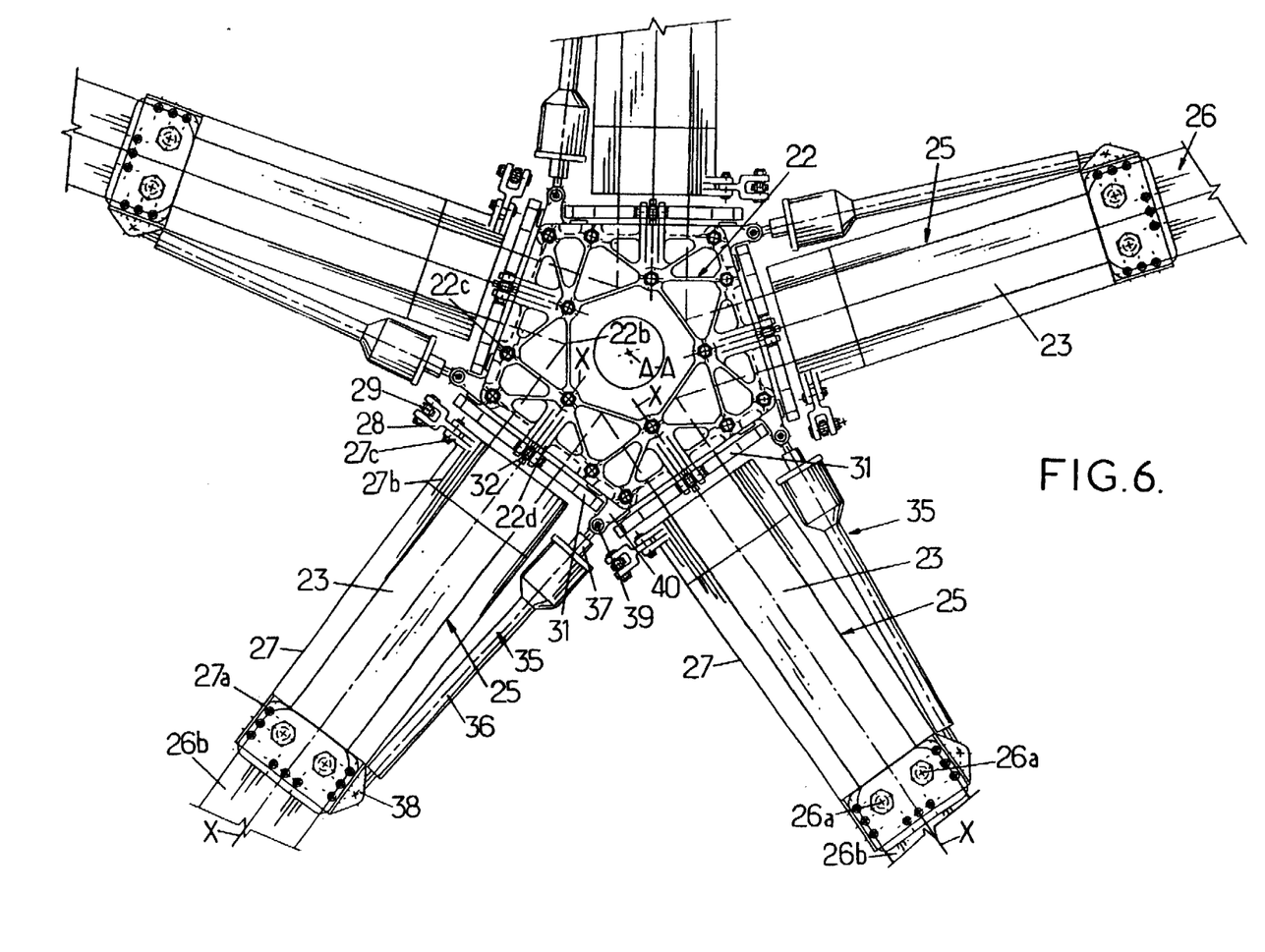
FIG. 6 is a partial plan view of a five-bladed main rotor having, for each blade, an architecture analogous to FIGS. 1 and 2.
Figures 7, 8, 9:
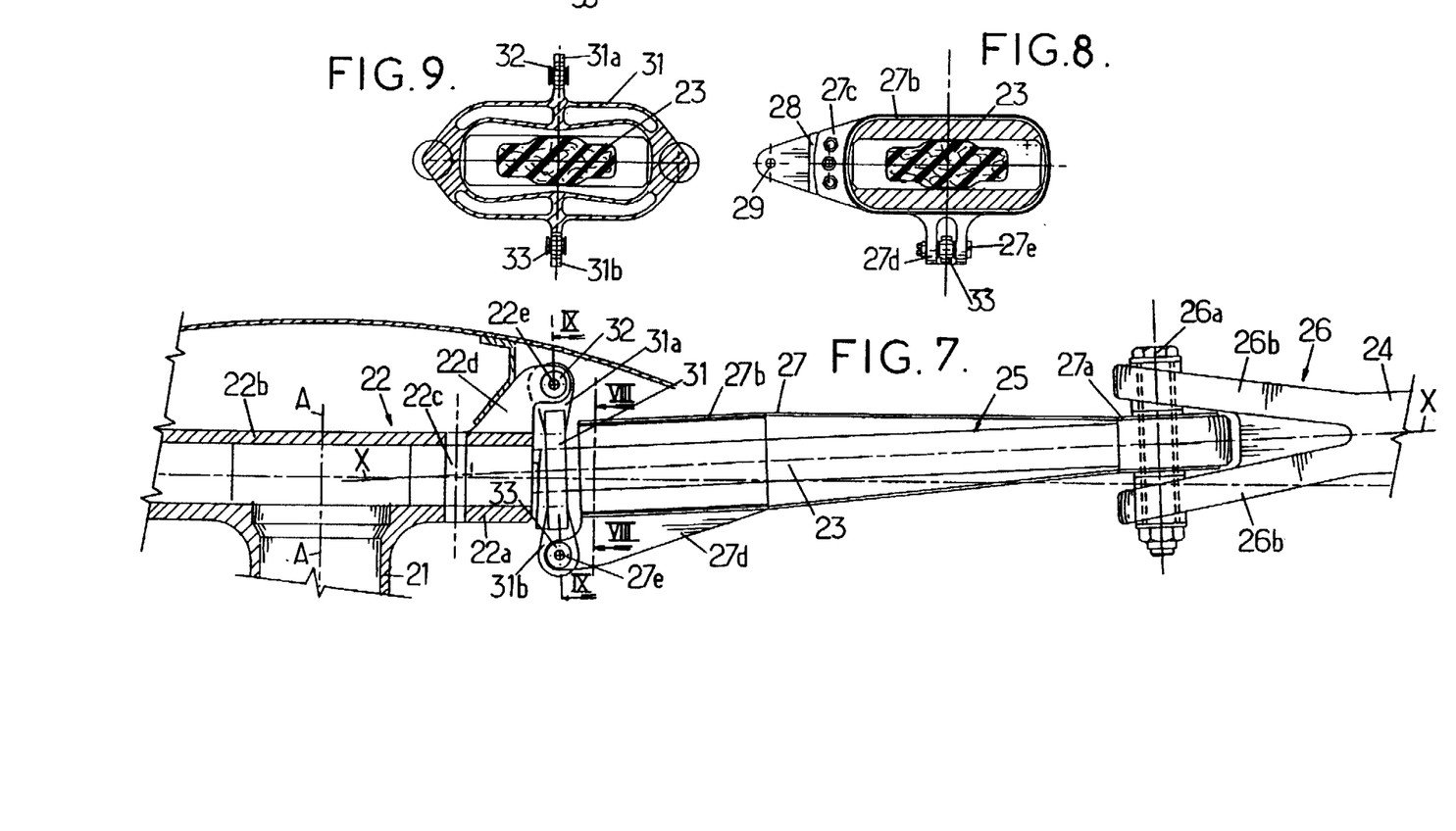
FIG. 7 is a diagrammatic view in part section of the rotor of FIG. 6 on the pitch axis of one of the blades.
FIGS. 8 and 9 are views in part section respectively on lines VIII—VIII and IX—IX of FIG. 7.

FIGS. 6 and 7 partially represent one example of a five-bladed hingeless helicopter main rotor comprising a rotor mast 21 driven in terms of rotation by its base about the axis A—A of the rotor, and the upper end of which is of a single piece with a lower plate 22a of a hub 22 secured in terms of rotation to the mast 21 and also comprising an upper plate 22b, of the same pentagonal shape as the lower plate 22a. The two plates 22a and 22b are superimposed and bolted together by screw-nut assemblies represented diagrammatically as 22c, trapping between them the internal (with respect to the axis A—A) radial end parts of composite thin strips 23, each forming a twistable and flexible arm 25, constituting the root attachment part of a blade 24.

Each arm 25 is thus set via its radially internal end inbetween the two plates 22a and 22b of the hub 22, and its radially external end is held in a clevis of the forked root 26 of the corresponding blade 24, with the aid of two fixing pins 26a passing through bores pierced facing each other in each of the two arms 26b of the blade root clevis 26 and in the thin strip 23. As an option, one of the two bolted pins 26a mounted side by side is removable, to allow the blade 24 to be "folded" by pivoting about the other pin 26a in the arms 26b of the blade root clevis 26 for holding the blade 24 on its root attachment arm 25 on the hub 22.

As in the preceding examples, the central axis of the thin strip 23 corresponds to the pitch axis X—X of the blade 24, and the thin strip 23 has a transverse section of substantially rectangular shape flattened in the plane of rotation of the rotor, that is to say that its width, perpendicular to the pitch axis X—X and axis A—A of the rotor, is greater than its thickness parallel to the axis A—A.

Also as in the preceding examples, each arm 25 is surrounded by a torsionally rigid cuff 27 which is secured in terms of torsion by its radially external end 27a to the corresponding end of the twistable arm 25 and to the root 26 of the blade 24, also being held by the pins 26a between the arms 26b of the clevis of the forked blade root 26.

Except at its radially external end 27a, the cuff 27, of frustoconical overall shape with an oval or oblong transverse section converging radially outwards, surrounds the twistable arm 25 without contact.

The major and minor axes of the substantially oval transverse section of the cuff 27 are, as in the preceding examples, oriented respectively along the length and along the height of the transverse section of the thin strip 23, that is to say parallel respectively to the imaginary axis of flapping and to the imaginary axis of drag, in the position of rest, the central axis of the cuff 27 then being coincident with that of the thin strip 23. At its radially internal end, the internal part 27b of the cuff 27 bears a pitch lever 28 projecting laterally outward from the cuff 27, on the leading edge or trailing edge side of the corresponding blade 24. This pitch lever 28 is attached by bolting to a lateral clevis 27c of the internal cuff part 27b, and it is itself shaped into a clevis in which a ball joint 29 for articulation to the upper end of a corresponding pitch-control rod (not represented) is articulated and held by a transverse pin. As in the example of FIGS. 1 and 2, the ball joint 29 is centred on the major axis of the transverse section of the radially internal end 27b of the cuff 27, that is to say on or close to the imaginary axis of flapping of the corresponding blade 24.

The cuff 27 also exhibits, under its internal part 27b, a clevis 27d with two branches which are parallel to each other and to the mid-plane of the cuff 27 passing through the minor axis of its transverse section, and these two clevis branches 27d project radially towards the axis A—A in the direction of the hub 22 with respect to the radially internal end of the cuff 27 (see FIG. 7).

For each blade 24, and in a way which is substantially symmetric with respect to the pitch axis X—X and to the central axis of the corresponding cuff 27, the hub 22 exhibits, projecting above its upper plate 22b, and at the same time projecting radially outwards, a clevis 22d with two branches parallel to one another and oriented radially outwards.

As in the preceding examples, an intermediate ring 31 which is rigid in terms of torsion about the pitch axis X—X is arranged, without contact at rest, around that part of the thin strip 23 of the twistable arm 25 which extends between the hub 22 and the radially internal end of the corresponding cuff 27. This ring 31, of oval or oblong transverse section, the major and minor axes of which are, at rest, oriented parallel respectively to the major and minor axes of the transverse section of the cuff 27 and of the thin strip 23, supports two lugs projecting radially outwards, and one 31a of which is directed towards the top face of the ring 31, and the other 31b of which is directed towards the bottom face of this ring. These two rounded lugs 31a and 31b are centred both on the minor axis of the transverse section of the ring 31 and in the mid-plane of this ring 31, perpendicular to its central axis. A ball joint 32 mounted in the upper lug 31a is held by a transverse pin 22e between the two branches of the corresponding clevis 22d of the hub 22 to articulate the intermediate ring 31 thereto. Symmetrically, in a diametrically opposite position on the ring 31, a ball joint 33 mounted in the lower lug 31b of this ring is held by a transverse pin 27e between the two branches of the clevis 27d projecting under the corresponding cuff 27, to articulate the ring 31 to this cuff 27.

Figure 10:
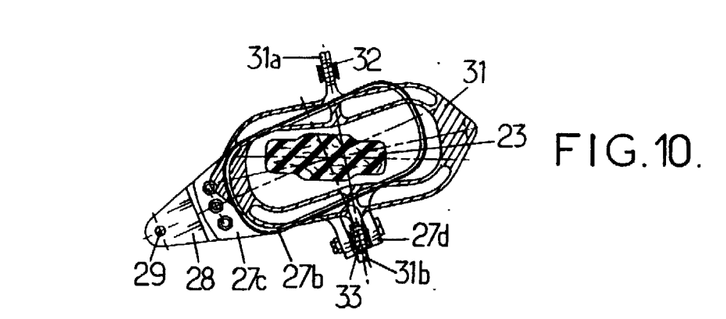
FIG. 10 is a superimposed diagrammatic view of the sections of FIGS. 8 and 9 for a pitch position which is different from the initial position.

As in the example of FIGS. 1 and 2, the two ball joints 32 and 33 are identical, and each allow a limited maximum angular travel of the relative pivotings of the cuff 27 on the ring 31 in the case of the ball joint 33 and of the ring 31 on the hub 22 in the case of the ball joint 32, which is the same and slightly greater than half the total pitch range of the corresponding blade 24. FIG. 10 represents the relative positions of the thin strip 23, of the cuff 27 and of the ring 31 when tension exerted on the corresponding pitch-control rod (not represented) causes the pitch lever 28 to pivot downwards driving the cuff 27 with it in rotation with respect to the ring 31, by virtue of the angular travel permitted by the ball joint 33 in the clevis 27d, at the same time as the ring 31 pivots in the same direction, but with half the amplitude, by virtue of the travel of the ball joint 32 in the clevis 22d of the hub 22. FIG. 10 also shows that the centre of the cuff 27 remains substantially on the centre of the thin strip 23, while the centre of the intermediate ring 31 undergoes slight shifts in terms of flapping and in terms of drag, for the same reasons as those already mentioned hereinabove for the example of FIGS. 1 and 2.

For the rotor of FIGS. 6 to 10, the operation of the pitch-control device, the structure of which has just been described, is otherwise identical to that explained with reference to FIGS. 1 to 4.

However, in this example, the drag damping of each blade 24 is provided, in a known manner, by a drag damper 35 which is elongate and of any suitable structure and mounted between the radially external end 27a of the cuff 27 and the hub 22.

More precisely, one end of the elongate body 36 of the damper 35 is articulated by a ball joint at 38 laterally to the external end part 27a of the cuff 27, on the opposite side from the pitch lever 28, while the free end of the rod 37 of the damper 35 is articulated by a ball joint 39 to a support 40 projecting substantially radially outwards on the periphery of the hub 22, to which this support 40 is fixed by one of the bolted links 22c securing the hub plates 22a and 22b together. This support 40 projects between the intermediate ring 31 provided for the corresponding blade and the ring 31 for an adjacent blade 24. For preference, the ball joints 38 and 39 are centred in the plane of rotation of the rotor, the ball joint 39 like the ball joint 29 also being centred on or close to the axis of flapping of the corresponding blade 24, while the ball joints 32 and 33 are centred, at rest, on or close to the corresponding imaginary axis of drag. In this example, the drag damper 35 is therefore not associated with a second intermediate ring, as in FIG. 5, but extends substantially along the cuff 37 laterally on the opposite side from the pitch lever 28.

In the various examples described hereinabove, the ball joint 9 or 29 for articulation of the cuff 7 or 27 to the pitch rod 10 is centreed on the major axis of the oval section of the ring 11 or 31, that is to say substantially on or close to the axis of flapping B—B of the blade 4 or 24 and the ball joints 12 and 13 or 32 and 33 for articulation of the ring 11 or 31 respectively to the hub 2 or 22 and to the cuff 7 or 27 are centred on the minor axis of this oval section, that is to say substantially on or close to the axis of drag T—T of the blade 4 or 24.

However, an optimization as required or a minimization of the pitch/drag, pitch/flap and flap/drag pairings may be obtained by an appropriate arrangement of the ball joints 9 or 29, 12 or 32 and 13 or 33.

Figure 11:
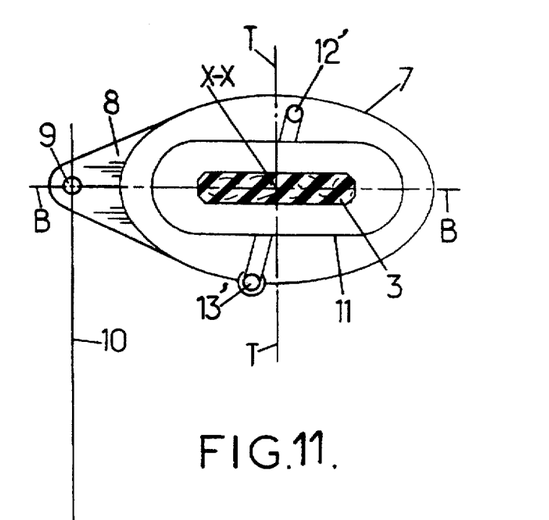
FIG. 11 is another view analogous with FIG. 2 for another alternative.

In particular, as represented diagrammatically in FIG. 11, which corresponds to an alternative to FIG. 2, the ball joints 12' and 13' articulating the ring 11 respectively to the hub 2 and to the cuff 7 are no longer centred on the minor axis of the oval section of the ring 11, corresponding to the axis of drag T—T, but are centred one on one side and the other on the other side of the minor axis of this oval section, substantially at equal distances from this minor axis, and thus on either side of the axis of drag T—T.

In this configuration, a stabilizing effect is obtained because the pitch of the corresponding blade 4 increases if this blade 4 retreats by rotating about its axis of drag T—T, and with respect to the direction of rotation of the rotor and, conversely, the pitch decreases if the blade 4 advances about the axis T—T. Now, it is known that the blade 4 advances as it rises, by rotating about its axis of flapping B—B (in the direction moving it away from the rotor mast 1), and conversely that it retreats as it falls by rotating about the axis B—B in the direction moving it closer to the mast 1, which generates continuous drag oscillations.

The purpose of the drag dampers, such as 15 and 35 in the examples of FIGS. 5 and 6 to 10, is precisely to attenuate these drag oscillations. However, in the configuration of FIG. 11, it may be observed that the retreat of the blade 4 may be reduced as it falls because when retreating its pitch increases, which increases the lift and consequently reduces the falling of the blade. The result of this is that the stabilizing effect afforded by the configuration of FIG. 11 makes it possible to reduce the size of the drag damper 15 or 35 and optionally to dispense with it if other known means are employed for controlling the drag movements of the blades of the rotor.

In the various examples described hereinabove, the ball joints for articulation of the intermediate ring or rings, such as the ball joints 12, 13, 18, 19 and 32 and 33 may be standard ball joints. However, it is advantageous to use ball joints of the kind marketed by the British company AMPEP PLC, from Clevedon, AVON, which are self-lubricating ball joints known under the trade name FIBERSLIP, the coating of which consists of a material with a low coefficient of friction, such as PTFE, as woven filaments on a backing layer made of a fibreglass fabric impregnated with a phenolic resin.

We claim:

1. A hingeless rotor comprising:

a rotor mast driven in rotation about an axis of the rotor,

13 a hub secured in terms of rotation to the mast, at least two blades, each of which is, firstly, joined to the hub by a root attachment part comprising at least one arm which can twist about a longitudinal pitch-change axis of the blade and, secondly, equipped with a cuff which is rigid in torsion, surrounding the at least one twistable arm, and the radially external part of the cuff, with respect to the rotor axis is secured in terms of torsion to the blade and to the twistable arm about the pitch-change axis, while the radially internal part of the cuff surrounds, without contact, the at least one twistable arm and exhibits a pitch lever projecting towards the outside of the cuff and joined to a pitch-control rod, wherein, for each blade, an intermediate pitch-control ring which is rigid in terms of torsion about the corresponding pitch-change axis, and which surrounds the corresponding at least one twistable arm is arranged substantially between the hub and the radially internal part of the corresponding cuff, the ring being joined to the hub and the radially internal part of the corresponding hub by two ball joints, the first one of which articulates the ring to the hub and the second one of which articulates the ring to the cuff.

2. A-rotor according to claim 1, wherein the mid-plane of the ring, perpendicular to its axis, is substantially perpendicular to the pitch-change axis of the corresponding blade.

3. A rotor according to claim 1, wherein each of the two ball joints is held on the ring in respectively one of two positions which are substantially opposite one another with respect to the center of the ring.

4. A rotor according to claim 3, in which each twistable arm has substantially the shape of a thin strip with its transverse section whose longest dimension is substantially perpendicular to the axis of the rotor and pitch-change axis of the corresponding blade, wherein at least the radially internal part of the corresponding cuff and the corresponding intermediate ring each exhibit a substantially oval transverse section with their major axes substantially perpendicular to the axis of the rotor and corresponding pitch-change axis.

5. A rotor according to claim 4, wherein the pitch-control rod is articulated to one end of the pitch lever which projects laterally with respect to one end of the major axis of the transverse section of the cuff in its radially internal part.

6. A rotor according to claim 1, wherein the pitch-control rod is articulated to the pitch lever by a third ball joint centered substantially in the rotor plane, passing through the pitch-change axis and perpendicular to the rotor axis.

7. A rotor according to claim 1, wherein the intermediate ring bears two substantially radial lugs projecting towards the outside of the ring in two opposite directions, and in each of which there is mounted respectively one of the two ball joints for linking of the ring, the two ball joints being centered substantially in the mid-plane of the ring and each held by a transverse pin, the first ball joint in a clevis projecting laterally and radially above the hub, and the second ball joint in a clevis projecting under the cuff.

8. A rotor according to claim 1, wherein the ball joint for linking of the ring allows a limited maximum angular travel for the relative pivoting of the hub and the radially internal part of the corresponding cuff which the ring articulates together, the sum of the maximum angular travels of the two linking ball joints being at least equal to amplitude of a total pitch range.

9. A rotor according to claim 8, wherein said limited maximum angular travel of each linking ball joint is substantially equal to half the amplitude of the total pitch range.

10. A rotor according to claim 1, comprising, for each blade, a second intermediate ring which is also rigid in terms of torsion about the corresponding pitch-change axis and which also surrounds the corresponding at least one twistable arm and is arranged between the hub and the corresponding cuff, the second ring being secured to at least on drag damper of the corresponding blade in an assembly which is articulated, firstly, by a fourth ball joint to the corresponding cuff and, secondly, by a fifth ball joint to a fixing point, the fourth and fifth ball joints being substantially centered in the rotor plane, passing through the pitch-change axis and perpendicular to the rotor axis.

11. A rotor according to claim 10, wherein said fixing point is a point which is stationary in a rotating reference frame, on the hub or on the rotor mast.

12. A rotor according to claim 10, wherein said fixing point is a point which is stationary on the cuff of another blade of the rotor.

13. A rotor according to claim 12, wherein said another blade comprises a neighboring blade.

14. A rotor according to claim 10, wherein the second ring has its axis substantially parallel to the rotor plane and the mid-plane of the ring perpendicular to the axis of the ring, which is arranged substantially parallel to the mid-plane of the intermediate ring joined to the hub and to the corresponding cuff.

15. A rotor according to claim 10, wherein said articulated assembly comprises a single drag damper laterally secured to the second ring, which is articulated directly to the cuff by the fourth ball joint, while the damper is articulated directly to the fixing point by the fifth ball joint on the opposite side from the fourth ball joint with respect to the center of the second ring and its securement with the damper.

16. A rotor according to claim 10, in which each twistable arm has substantially the shape of a thin strip with transverse section whose longest dimension is substantially perpendicular to the axis of the rotor and the corresponding pitch-change axis, wherein the second ring has axis substantially perpendicular to the axis of the rotor and the corresponding pitch-change axis, and on which the fourth and fifth ball joints are substantially centered.

17. A rotor according to claim 6, in which, for each blade, the at least one twistable arm is also flexible in terms of flapping about an imaginary axis of flapping substantially perpendicular to the corresponding pitch-change axis and to the rotor axis, wherein the first, second and third ball joints are centered substantially in or close to a plane perpendicular to the corresponding pitch-change axis and passing through the axis of flapping.

18. A rotor according to claim 1, in which, for each blade, the at least one twistable arm is also flexible in terms of drag about an imaginary axis of drag substantially perpendicular to the corresponding pitch-change axis and substantially parallel to the rotor axis, wherein the first and second ball joints for linking of the intermediate ring are centered substantially on or close to the axis of drag.

19. A rotor according to claim 1, in which, for each blade, the at least one twistable arm is also flexible in terms of drag about an imaginary axis of drag substantially perpendicular to the corresponding pitch-change axis and substantially parallel to the rotor axis, wherein the first and second ball joints for linking of the intermediate ring are centered on either side of the axis of drag, substantially at equal distances from this axis.

20. A rotor according to claim 10, in which, for each blade, the at least one twistable arm is also flexible in terms of flapping about an imaginary axis of flapping substantially perpendicular to the corresponding pitch axis and to the rotor axis, wherein the first, second, third, fourth and fifth ball joints are centered substantially in or close to a plane perpendicular to the corresponding pitch-change axis and passing through the axis of flapping.

* * * * *